May 20, 1958  M. H. GRAHAM  2,835,188
AUTOMATIC TEA MAKER
Filed April 27, 1955

United States Patent Office 2,835,188
Patented May 20, 1958

2,835,188

AUTOMATIC TEA MAKER

Maurice H. Graham, deceased, late of Minneapolis, Minn., by Northwestern National Bank of Minneapolis and Maurice W. Graham, executors, Minneapolis, Minn., assignors to Maurice W. Graham and Elwood M. Graham, trustees Application April 27, 1955, Serial No. 504,244

1 Claim. (Cl. 99—299)

This invention relates to tea brewing devices and more particularly to devices which hold a quantity of water and means for introducing a tea essence thereinto.

It is an object of the invention to provide a tea maker which will be substantially automatic in operation so that no attention need be given to the timing of the essence-making period.

It is another object of the invention to provide a tea maker which will automatically furnish a predetermined degree of tea essence of proper strength.

It is a further object of the invention to provide a tea brewing device which will be compact, simple to manufacture, easily handled, and operated, and having a minimum number of relatively simple parts which may be readily cleaned.

Other objects and features of the invention will be apparent from the description which follows.

In brief, the invention comprises the utilization of a tea basket holding a predeterminable quantity of tea leaves and into which basket a fixed quantity of hot water may be poured. The tea basket has one or more perforations to permit tea essence to drip therefrom into a bowl of hot water. The arrangement is such that the essence brewed drips out of the basket in a predetermined time so that if the proper amount of tea leaves has been used the essence will always be of uniform strength and optimum palatability. Thus, the bowl is initially filled with a quantity of hot water, depending upon how many cups of tea are desired. Then the basket is charged with tea leaves in quantity corresponding to the number of cups of tea to be made. The fixed quantity of water inserted into the basket then mixes with the tea leaves and brews an essence which drips out of the basket into the hot water in the bowl. The rate of dripping is carefully controlled, preferably by the use of a single perforation in the bottom of the basket through which all of the essence must pass. A suitable straining means is furnished to prevent blocking of the perforation and also to prevent access of tiny fragments of tea leaves from passing into the bowl.

The basket and bowl are constructed so as to form a compact article with the basket fitting into the neck of the bowl and not extending thereabove, so that a neat and readily handled container is effected.

A more detailed description of the invention will now be given in conjunction with the drawing, in which.

Figure 1:
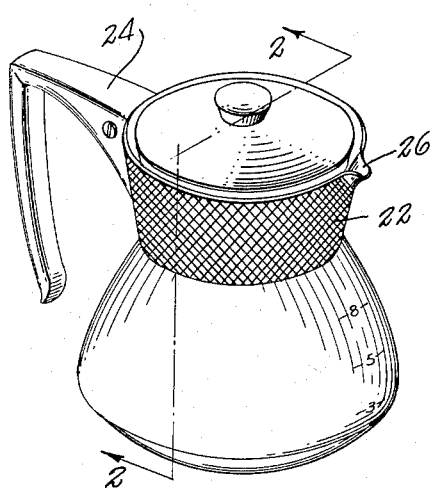
Fig. 1 is a perspective of the invention showing a bowl having a basket inserted in the neck and a cover element over the basket.

With reference to the drawing, and particularly Figs. 1 through 4, the invention comprises a bowl 10, preferably of glass, having a neck portion 14, which is flared so as to be larger at the top end than at the lower end where it joins in a ridge 18 with the main bowl portion 10. Exteriorly surrounding the neck portion is a metallic skirt 22 which fits snugly and to which is secured a handle 24 in a manner well understood by persons skilled in the art. Skirt 22 is made so as to have a large area for radiation cooling of the bowl neck to effect condensation of steam arising from the bowl, whence the condensate can drip back into the bowl. The upper edge of the neck portion is provided with a pouring lip 26. The bowl body is provided with indicia marks as will be seen in Fig. 1 indicating levels for cups of tea to be brewed. Thus, the levels for 3, 5, and 8 cups are indicated by numerals scribed on the bowl as shown. Insertable in the neck is an annular tea basket 30 having a non-perforate annular wall 34 and a bottom wall 36 provided with a recess 38. The bottom surface of the recess is provided with a single perforation 40. Closely fitting within the recess, being readily insertable thereinto and removable therefrom, is a strainer means comprising a cap element 42, a filter mesh disc 44, and a clamping ring 46 preferably having a milled periphery 47. The cap element is provided with perforations 48 and a knob 50. Thus, the mesh disc 44 may be inserted into the cap inside a rim 52 thereof and the clamping ring 46 force fitted inside the rim so as to securely hold the filter disc therein. Preferably the filter disc is of fine metal mesh.

The composite structure comprising the strainer means may thus be lifted by means of the knob 50 out of the recess 38 or insertable therein. The arrangement described provides a readily cleanable device since the perforation 40 is fully exposed after the strainer has been removed and the strainer itself, which is a permanent assembly, can be thoroughly cleaned since the mesh element is fully exposed on its undersurface and largely exposed at its upper surface due to the perforations 48.

It should be noted that the recess 38 is at the lowermost portion of the basket so that all the essence in the basket will be permitted to drain into the bowl.

Leading to the recess 38 are sloped bottom wall portions 60 and 62 to insure proper flow of essence to the recess.

Figure 2:
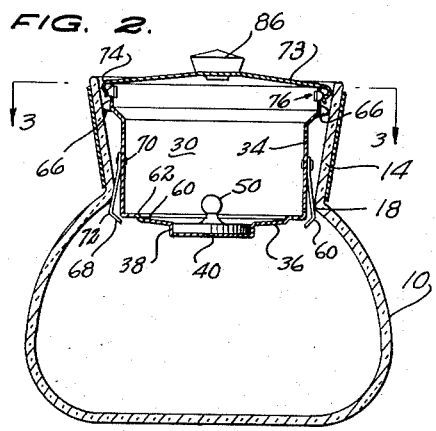
Fig. 2 is a section through 2—2 of Fig. 1.

The basket is properly centered and retained in the conical cavity in the neck by means of dimples such as 66 which engage the inner surface of the neck as will be apparent from Fig. 2. Preferably three or more dimples angularly spaced are used and are stamped from the metal of the basket, assuming the basket to be made of sheet metal.

The basket is retained within the bowl neck by means of spring leaves 68, fastened thereto by rivets 70, and V shaped as to clip beyond the ridge 18. Thus, when the basket is forced downwardly the spring leaves 68 retract and the bent corners 72 thereof snap past the ridge in a manner which will be readily understood to retain the basket in proper position and prevent it rattling when the bowl is picked up. It was found that two such spring leaves diametrically disposed are suitable.

A cover 73 may be provided having a reentrant rim 74 which engages a pair of suitable spring clips 76 disposed at the upper rim of the basket for retaining the cover in place. Thus, each clip 76 comprises a small spring leaf 80 to which is fastened detent point 82 that protrudes through a bore in the basket. When the cover is forced down over the top of the basket the flange 74 serves to push the points 82 inwardly against the bias of springs 80 until ultimately the points 82 are permitted to snap outwardly to grip within the groove formed by the reentrant flange.

The cover is provided with a knob 86 so that it may be readily removed and replaced.

In operation, with the basket removed, a quantity of hot water is placed in the bowl depending on the number of cups of tea desired. Then the basket is replaced and charged with a suitable amount of tea leaves and filled with hot water. The perforation 40 is of such size that the basket empties into the bowl in about 3–5 minutes.

Figure 5:
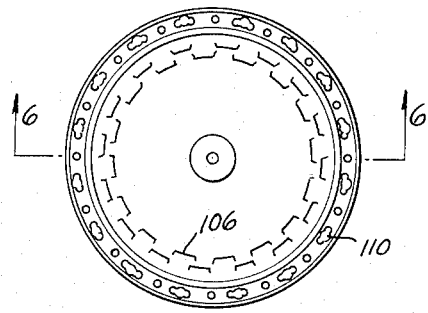
Fig. 5 is a plan view of a modified form of the basket.
Figure 6:
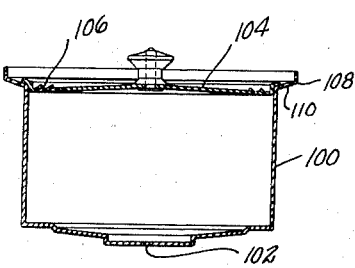
Fig. 6 is a section through 6—6 of Fig. 5.
Figure 3:
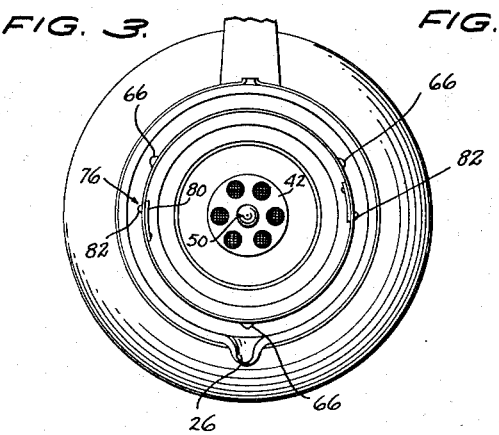
Fig. 3 is a plan view through 3—3 of Fig. 2, looking down into the tea brewing basket.
Figure 4:
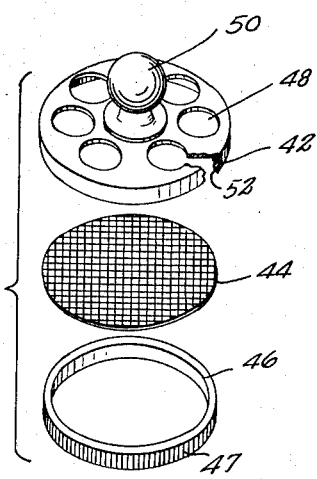
Fig. 4 is an exploded view of the strainer element showing the several elements thereof.

A modified form of basket is shown in Figs. 5 and 6 wherein a non-perforate annular wall 100 is utilized together with the single perforation 102, all as previously described for the basket shown in the prior modification. Likewise, it will be understood that a strainer element such as shown in Fig. 4 will be utilized together with a bowl such as the bowl 10. In the use of the modified basket, however, the bowl is not initially filled with a predetermined quantity of hot water. The basket, after having been charged with tea leaves, is placed in the bowl and hot water is poured directly on to the cover 104. The cover is provided with a large plurality of openings 106, as by slitting or punching, so that hot water can have access into the basket interior. The basket is also provided with a flange 108 containing a large number of perforations 110 so that at the same time that some of the water is going into the basket interior through the ports 106 to fill the basket, most of the water will actually pour through the perforations 110 directly into the bowl.

As a practical proposition the bowl may be filled up to the proper level within a matter of a few seconds while the water trapped in the basket will take the usual amount of time to issue therefrom through the perforation 102.

In any event, the modified basket shown in Figs. 5 and 6 operates precisely in the manner of the basket described in conjunction with Figs. 1 through 4, namely, the retention of substantially a fixed quantity of water which, mixed with tea leaves, forms an essence while simultaneously dripping into a bowl of hot water for a preferred period of three to five minutes. Thus, the brewing time is standardized for either form of basket.

While it is preferable to use a single perforation as a means of egress for tea essence at the bottom of the tea-holding basket, such preference is based on structural simplicity in manufacture, and the fact that a single perforation is easier to clean than a plurality of smaller perforations. It should be understood, of course, that the invention is in no way limited to the number of perforations used for egress, just so long as the rate of dripping is suitably correlated with the quantity of water in the basket so as to empty the basket in a time period of from 3 to 5 minutes and preferably in about three minutes for conventional commercial brands of tea. It will likewise be appreciated that the quantity of tea leaves used should be standardized depending upon the number of cups of tea to be brewed. For example, one level teaspoon of tea leaves for each cup depending upon taste of the particular user. If desired, the device may be used in conjunction with tea bags, although it will, of course, be appreciated that persons who find the pulpy taste of tea brewed from tea bags objectionable, will prefer using loose tea. Preferably, the water placed in the basket for brewing into essence should be boiling hot so as to standardize conditions whereat the basket will empty in a substantially standardized time producing a standard strength of essence and a standard quality of tea. It will, of course, be understood that the hotter the water the more economy may be effected in the use of tea leaves since for the same time of exposure of the leaves to the water the stronger will be the essence.

If desired the bowl may be formed of sufficiently heavy material to be susceptible of being directly heated on a range or hot plate to bring the water to a boil. And if desired, any suitable pumping means may be provided for transferring a portion of the heated water to the brewing chamber.

Having thus described the invention, it is understood that changes may be made without departing from the spirit thereof and accordingly it is not sought to be limited by the precise illustrations herein given except as set forth in the appended claim.

What is claimed is:

A tea maker comprising a bowl for holding a predeterminable quantity of hot water, said bowl having an enlarged body portion with a neck portion joined thereto and extending upwardly therefrom, the neck portion having a smaller diameter than the body portion whereby an internal annular ridge is effected at the juncture between the neck portion and the body portion, the neck portion being flared so as to widen toward the upper end thereof, the upper edge of the neck portion being provided with a pouring lip, a tea basket supportable within the neck portion of the basket for holding leaves and a quantity of hot water for brewing tea essence from said leaves, said basket having a perforation in its bottom wall providing egress of the essence to the bowl, the bottom wall of the basket having a circular recess strainer means adapted to fit snugly within said recess for frictional retention therein, said strainer means having a central projecting knob for manual insertion or removal of the strainer from the recess, said basket having a plurality of resilient clips connected at peripherally spaced points about the exterior thereof and extending downwardly from their points of connection to frictionally engage said ridge for removably securing the basket in the neck portion of the bowl, enabling the bowl to be tilted to completely drain the body portion of the essence over the ridge and pouring lip without displacement of the basket or the strainer means.

References Cited in the file of this patent

UNITED STATES PATENTS

| | | |
|---|---|---|
| 806,595 | Steck | Dec. 5, 1905 |
| 874,479 | Anderson | Dec. 24, 1907 |
| 929,388 | Clement | July 27, 1909 |
| 1,143,239 | Talbutt et al. | June 15, 1915 |
| 1,188,249 | Cook | June 20, 1916 |
| 1,357,051 | Heinrichs | Oct. 26, 1920 |
| 1,570,807 | Watson | Jan. 26, 1926 |
| 1,665,143 | McMillan et al. | Apr. 3, 1928 |
| 1,687,095 | Jones | Oct. 9, 1928 |
| 1,767,956 | Bachelder | June 24, 1930 |
| 1,831,923 | Meyer | Nov. 17, 1931 |
| 2,171,320 | Miller | Aug. 29, 1939 |
| 2,241,368 | Schlumbohm | May 6, 1941 |
| 2,290,660 | Wilcox | July 21, 1942 |
| 2,381,151 | Wolcott | Aug. 7, 1945 |
| 2,550,902 | Beckelman | May 1, 1951 |

FOREIGN PATENTS

| | | |
|---|---|---|
| 1,167 | Great Britain | 1861 |
| 201,011 | Germany | Aug. 6, 1908 |
| 79,611 | Sweden | Feb. 20, 1934 |
| 601,634 | Great Britain | May 10, 1948 |